E. MILLER.
GLASS FURNACE.
APPLICATION FILED FEB. 19, 1912.

1,135,973. Patented Apr. 13, 1915.

Witnesses
Benjamin Finckel
Donald W. Kling.

Inventor
EDWARD MILLER
by Finckel & Finckel
his Attorneys

UNITED STATES PATENT OFFICE.

EDWARD MILLER, OF COLUMBUS, OHIO.

GLASS-FURNACE.

1,135,973. Specification of Letters Patent. Patented Apr. 13, 1915.

Application filed February 19, 1912. Serial No. 678,484.

*To all whom it may concern:*

Be it known that I, EDWARD MILLER, a citizen of the United States, residing at Columbus, in the county of Franklin and State of Ohio, have invented a certain new and useful Improvement in Glass-Furnaces, of which the following is a specification.

Where a gathering is removed as with a punty or iron repeatedly from a given point in a molten glass tank the effect is to cool the glass at that point and render it of uneven consistency and not adapted for the production of perfect articles when molded. Bubbles are also formed.

The object of the present invention is an improved means for keeping the molten glass in motion so that such relatively cooled places and bubbles are worked out and a fresh point of proper consistency presented for taking a gathering.

My invention is embodied in the construction herein shown and described, the features of novelty being pointed out in the claims.

Figure 1:
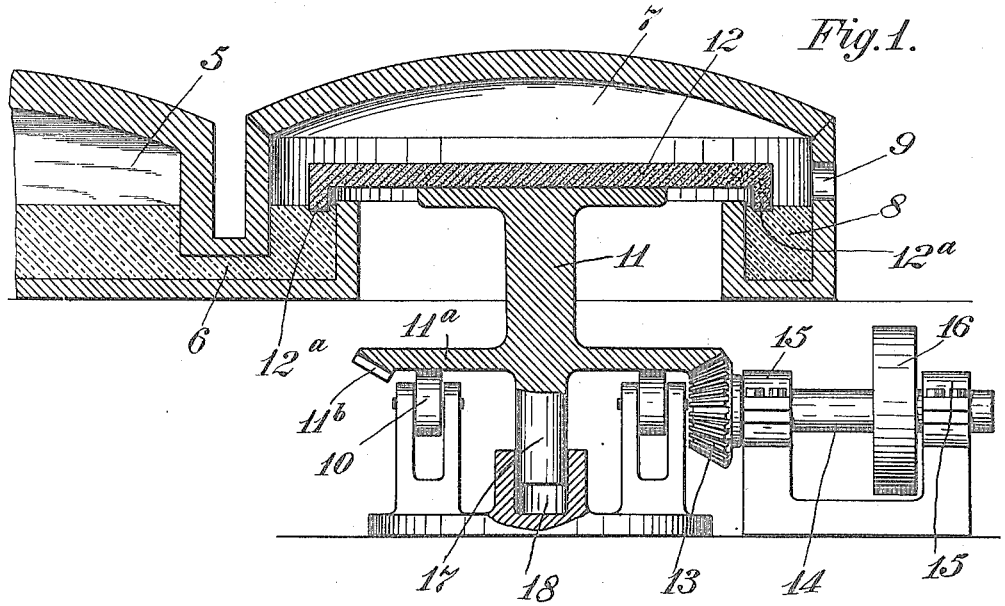
Figure 2:
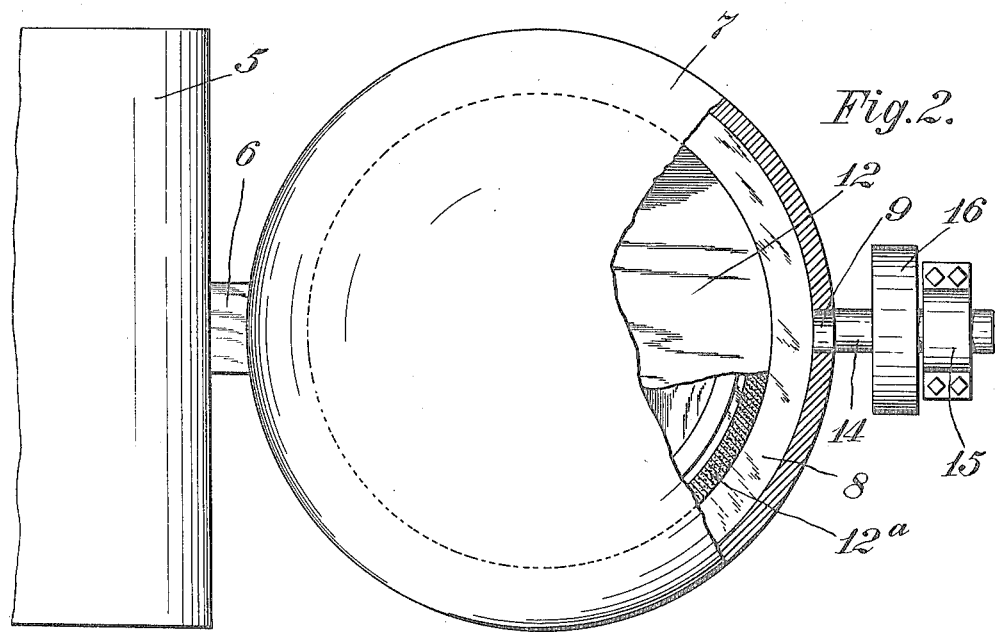

In the accompanying drawings forming part hereof—Figure 1 is mostly a central vertical section taken through the nose or working end of the molten glass chambers. Fig. 2 is a top plan view with parts in section to illustrate details.

In the views 5 designates the melting end or chamber which communicates by a passage 6 with the working end of chamber 7 or "nose" so called. The glass receiving portion of the nose is formed as a circular channel 8 leaving a free but covered space in the center of the nose under the dome. The nose has a suitable working hole at 9. Supported on roller bearings 10 below the aforesaid central space under the dome of the nose is a column 11 having secured on its upper end to turn with it a stone disk 12 that has at its rim a downwardly extending flange $12^a$ that dips into the molten glass in the circular channel 8. The column 11 where it rests on the roller bearings 10 is formed as an annular extension $11^a$ and the rim of this extension is formed as a beveled crown gear wheel $11^b$. The toothed rim $11^b$ is engaged by a beveled pinion 13 on a horizontal shaft 14 journaled in suitable bearings 15, said shaft having a pulley 16 to receive a suitable driving belt. The column is held in its proper place by a vertical stud 17 extending into a corresponding bearing 18.

When the work of gathering or removing molten glass for molding purposes is proceeding the stone 12 is constantly rotated by the application of power to the shaft 14 thereby imparting a flowing motion to the molten glass or the surface thereof past the working hole 9 or any other given point so that a fresh surface is presented adjacent to such opening or at such point. Because of this motion of the molten glass past the working hole places where the glass has been cooled by the insertion of the punty or other instrument and any bubbles or other irregularities in the consistency of the glass are worked out by the stirring action of the stone 12 and the glass brought to an even and proper condition for a gathering when it returns to the work hole.

The construction shown and described permits the imparting of motion to the glass without great exposure of the mass and an undue cooling effect.

The forms of the parts can be changed without departing from the gist of the invention.

What I claim is:

1. In a glass apparatus, the combination with a working chamber for containing the molten glass and from which chamber the glass is directly removed for blowing or molding, a stirring device having a rim dipping into the surface of the glass, said chamber having a working hole beyond and in proximity to the rim of the stirring device, said working hole located to permit the removal of the glass from the surface thereof radially beyond the outermost rim of the stirring device and in proximity thereto.

2. In a glass apparatus, means for imparting a circular motion to a mass of molten glass past a point of its removal consisting of, in combination, a circular receptacle open at its center, a support in said open center, a flanged device mounted on said support dipping into said glass receptacle and means for imparting rotary motion to said flanged device.

EDWARD MILLER.

Witnesses:
H. F. CROWE,
BENJAMIN FINCKEL.